US008442665B2

(12) United States Patent
Krause (10) Patent No.: US 8,442,665 B2
(45) Date of Patent: May 14, 2013

(54) SYSTEM, METHOD, AND APPARATUS FOR REPAIRING OBJECTS

(75) Inventor: Gregory Thomas Krause, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 84 days.

(21) Appl. No.: 12/859,659

(22) Filed: Aug. 19, 2010

(65) Prior Publication Data

US 2011/0087352 A1     Apr. 14, 2011

Related U.S. Application Data

(63) Continuation of application No. PCT/US2009/001044, filed on Feb. 19, 2009.

(60) Provisional application No. 61/066,286, filed on Feb. 19, 2008.

(51) Int. Cl.
*G06F 19/00*  (2011.01)
*B23P 6/007*  (2006.01)

(52) U.S. Cl.
USPC ............ 700/98; 700/182; 700/187; 700/189; 700/193; 703/2; 703/9

(58) Field of Classification Search .............. 700/98, 700/182, 186, 187, 193; 703/2, 9; 382/203; 348/92, 348/95; 29/888, 888.02, 888.021
See application file for complete search history.

(56) References Cited

U.S. PATENT DOCUMENTS 5,285,572 A * 2/1994 Rathi et al. ............... 29/889.1
5,805,289 A 9/1998 Corby, Jr. et al.
6,376,801 B1 4/2002 Farrell et al.
6,568,077 B1 * 5/2003 Hellemann et al. ........ 29/889.1
6,748,112 B1 * 6/2004 Nguyen et al. ................ 382/203

(Continued)

FOREIGN PATENT DOCUMENTS

| EP | 1312438 A1 | 5/2003 |
| EP | 1672170 A1 | 6/2006 |
| FR | 2897550 A1 | 8/2007 |

OTHER PUBLICATIONS

International Search Report and Written Opinion, PCT/US2009/001044, Apr. 16, 2009, Rolls-Royce Corporation.

(Continued)

*Primary Examiner* — John R. Cottingham
*Assistant Examiner* — Douglas Lee
(74) *Attorney, Agent, or Firm* — Krieg DeVault LLP (57) ABSTRACT

A system is disclosed including a three-dimensional object having a non-conforming region, and a photogrammetry device adapted to scan the three-dimensional object. The system further includes optical reference targets and a controller structured to perform functions of repairing the three-dimensional object. The controller commands the photogrammetry device to scan the three-dimensional object, and calculates a nominal surface location and contour for the three-dimensional object. The controller further commands the photogrammetry device to scan the non-conforming region of the three-dimensional object, and calculates a material removal tool path comprising a path adapted to remove material from the object located beyond the nominal surface location and contour. The controller generates a solid model of the damaged region of the object based on the nominal surface location and contour, and computes a material addition tool path according to the solid model.

22 Claims, 6 Drawing Sheets

U.S. PATENT DOCUMENTS

| | | | |
|---|---|---|---|
| 6,839,607 B2 | 1/2005 | Wooten | |
| 6,912,446 B2 * | 6/2005 | Wang et al. | 700/193 |
| 6,915,236 B2 | 7/2005 | Tanner et al. | |
| 6,940,037 B1 | 9/2005 | Kovacevic et al. | |
| 6,972,390 B2 | 12/2005 | Hu et al. | |
| 6,985,238 B2 | 1/2006 | Isaacs et al. | |
| 7,219,043 B2 | 5/2007 | Rebello et al. | |
| 7,433,799 B2 * | 10/2008 | Lin et al. | 702/167 |
| 7,472,478 B2 * | 1/2009 | Graham et al. | 29/888.021 |
| 7,797,828 B2 * | 9/2010 | Beeson et al. | 29/888.021 |
| 2002/0033885 A1 | 3/2002 | Schuler et al. | |
| 2002/0094134 A1 | 7/2002 | Nafis et al. | |
| 2004/0034444 A1 | 2/2004 | Graham et al. | |
| 2004/0039465 A1 | 2/2004 | Boyer et al. | |
| 2005/0106998 A1 * | 5/2005 | Lin et al. | 451/5 |
| 2005/0159840 A1 | 7/2005 | Lin et al. | |
| 2006/0090336 A1 | 5/2006 | Graham et al. | |
| 2007/0251072 A1 | 11/2007 | Beeson et al. | |

OTHER PUBLICATIONS

Extended European Search Report, EPO, EP09712168, Rolls-Royce Corporation, Feb. 16, 2012.

* cited by examiner

SYSTEM, METHOD, AND APPARATUS FOR REPAIRING OBJECTS

CROSS REFERENCE

The present application is a continuation of PCT/US2009/001044, filed Feb. 19, 2009, which claims priority to U.S. Patent Provisional Application No. 61/066,286, filed Feb. 19, 2008, each which is incorporated herein by reference.

BACKGROUND

Three-dimensional objects are generally difficult to repair in environments where machine tools are needed to effect the repair. Some objects, such as compressor blades and bladed disks ("blisks") also require precision repair without the introduction of distortions and stresses into the object. While the present application was developed for use with gas turbine engine components utilization in other areas of technology is contemplated herein.

In many cases manufacturer specifications for three-dimensional objects may be insufficiently detailed, or simply unavailable, for precision repair to be performed from drawings. A three-dimensional object may not be in complete conformance with a manufacturer specification or drawing after a period in-service due to changes in the part shape during use, even though the part shape, other than specific local damage, may be acceptable for use. Thus, a computer-controlled tool path based on an original manufacturer three-dimensional specification may not be appropriate for an efficient repair of a worn, non-conforming or damaged part. The development of a system, method, and apparatus for repairing three-dimensional objects is therefore desirable.

SUMMARY

In one aspect the present application contemplates a system including a three-dimensional object having a non-conforming region, and a photogrammetry device adapted to scan the three-dimensional object. The system further includes optical reference targets and a controller structured to perform functions of repairing the three-dimensional object. The controller commands the photogrammetry device to scan the three-dimensional object, and calculates a nominal surface location and contour for the three-dimensional object. The controller further commands the photogrammetry device to scan the non-conforming region of the three-dimensional object, and calculates a material removal tool path comprising a path adapted to remove material from the object located beyond the nominal surface location and contour. The controller generates a solid model of the damaged region of the object based on the nominal surface location and contour, and computes a material addition tool path according to the solid model.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and that such further applications of the principles of the invention as illustrated therein as would normally occur to one skilled in the art to which the invention relates are contemplated and protected.

Figure 1:
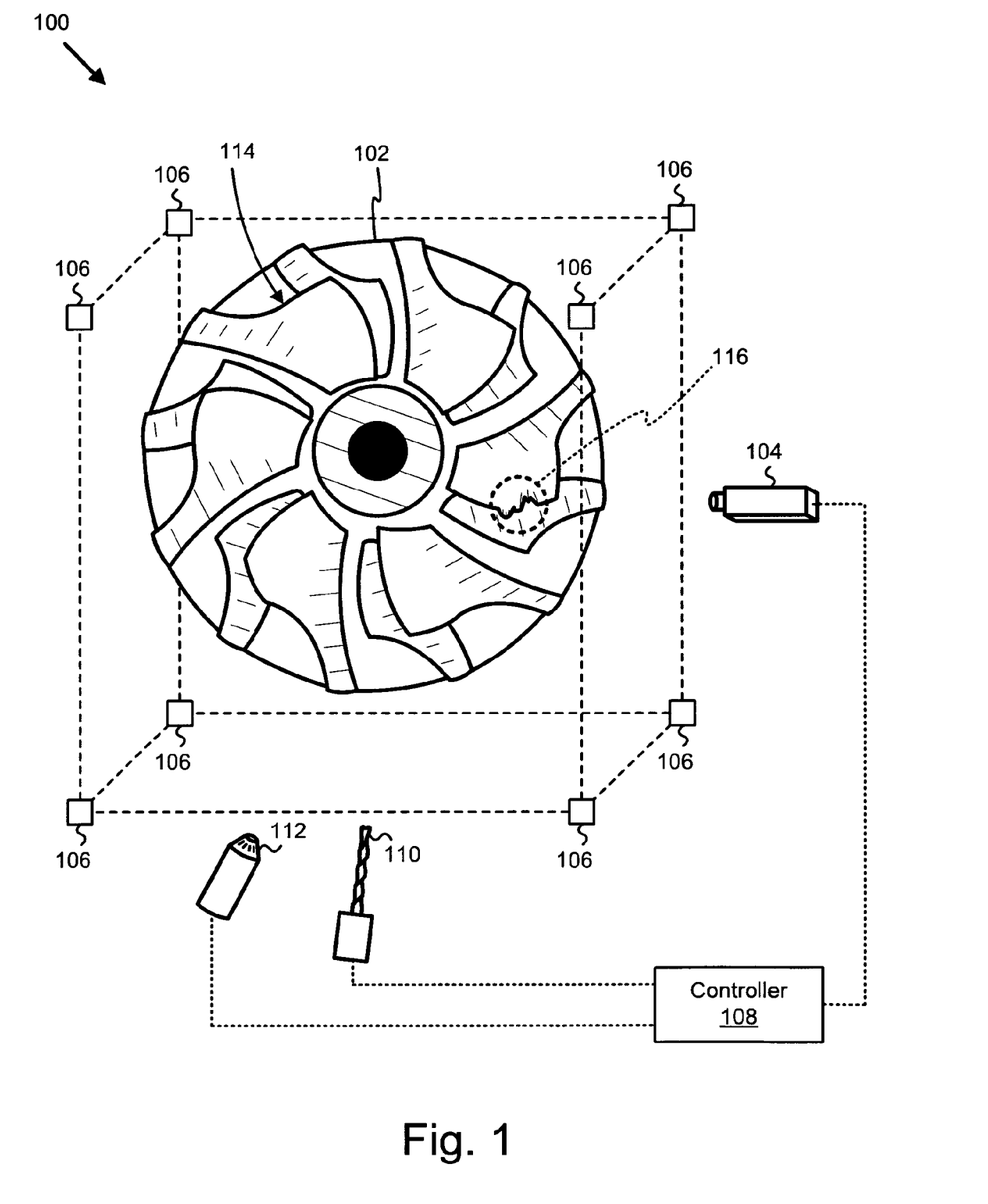
FIG. 1 is a schematic block diagram of a system for repairing a three-dimensional object.

FIG. 1 is a schematic block diagram of a system 100 for repairing a three-dimensional object 102. The object may be formed of a variety of materials including but not limited to metallic, inter-metallic, and ceramic. In one form the material is a metallic material. In another form the material is a metallic material suited for utilization in a gas turbine engine. The object may be any of a simple to complex three dimensional object. As used herein, a complex three dimensional object includes objects which are not easily specified by simple geometric shapes.

A complex three dimensional object may be considered complex due to shaping, inclusion of physical features, dimensioning, or other indicia of complexity generally understood to one of ordinary skill in the art. For example, a three dimensional object with one or more curvilinear surfaces that vary in three dimensional space is complex. In another example, an object having precise dimensional tolerances may be considered complex. The examples regarding complex are exemplary, and objects having other features that makes manufacturing, servicing or repair of the object non-simple is contemplated in the present application as a complex object. In certain embodiments, the object includes a surface having a plurality of concavities, for example a blade having a first concavity toward the blade base and a second concavity toward the blade tip. The application will utilize the term object and it is understood that this term contemplates from a simple object to a complex three dimensional object unless provided to the contrary.

The object 102 may include any object having a three-dimensional shape. In certain embodiments, the object 102 is a gas turbine engine component such as a bladed disk ("blisk"), such as a compressor rotor, turbine, or similar object. However, the present application contemplates other types of components for gas turbine engines and for other fields of use than gas turbine engines. The system 100 includes a photogrammetry device 104 adapted to scan the three-dimensional object 102. The photogrammetry device 104 may include one or more digital cameras configured to be controllably moved in relation to the object 102. The photogrammetry device 104 has sufficient resolution to resolve details of interest on the object 102, including detail comprising features of the object 102 and detail comprising damage that is to be evaluated or an area/region that is desired to be changed for other reasons.

The system 100 further includes optical reference targets 106. The optical reference targets 106 allow the photogrammetry device 104 to navigate the object 102 and define a coordinate space for describing the object 102 and object damage digitally. The system 100 further includes a controller 108 in communication with various aspects of the system 100. For example, the controller 108 commands the photogrammetry device 104 and receives data from the photogrammetry device 104. The controller 108 further communicates with one or more material removal tools 110 and/or one or more material addition tools 112. The controller 108 may be a computer processor and computer readable medium including memory storage, and the controller 108 may comprise multiple devices utilizing hardware, software, logic, and/or datalink communications to perform the functions of the controller 108. In certain embodiments, the controller 108 performs operations to repair the object 102 by commanding the photogrammetry device 104, and by commanding a material removal tool 110 and/or a material addition tool 112. More detailed operations for certain embodiments of the controller 108 are described in the section referencing FIG. 2.

Figure 2:
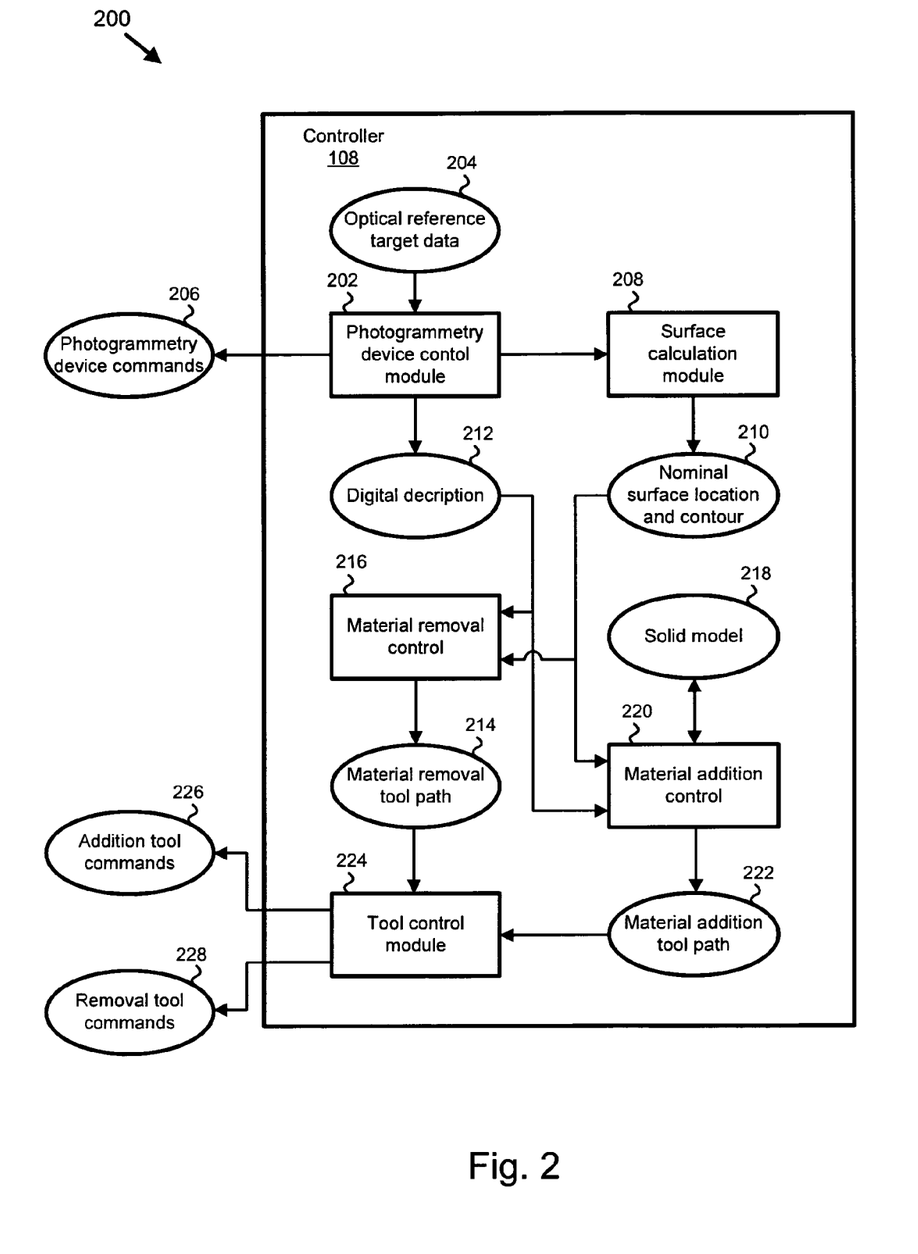
FIG. 2 is a schematic block diagram of a controller that functionally executes operations to repair a three-dimensional object.

FIG. 2 is a schematic block diagram of a controller 108 that functionally executes operations to repair a three-dimensional object 102. The controller 108 commands the photogrammetry device 104 to scan the three-dimensional object 102. For example, the controller 108 includes a photogrammetry device control module 202 that inputs optical reference target data 204, and provides photogrammetry device commands 206 to scan the object 102.

The controller 108 performs a contour mapping of the object 102, in certain embodiments by calculating a nominal surface location and contour 210 for the object 102. For example, the controller 108 may include a surface calculation module 208 that accepts data from the photogrammetry device control module 202 and calculates the nominal surface location and contour 210. The contour mapping 210 for the object 102 defines a nominal shape of the object 102, the nominal shape being a shape that allows the object 102 to perform a function of the object 102 acceptably, while changing as little of the basic structure of the object 102 as possible.

In one example, the object 102 is a centrifugal compressor wheel, where some blades 114 (see FIG. 1) of the compressor wheel have moved (e.g. via "creep") during service use of the compressor wheel, but the overall shape of the blades 114 is still acceptable for the compressor wheel to meet performance specifications. In the example, the contour mapping 210 of the object 102 defines the nominal shape of the object 102 to include the current shape of the blades 114 allowing repair to specific damaged sections 116 without changing the bulk blades 114 and thereby introducing unnecessary stresses into the object 102 or excessive repair expense.

The contour mapping 210 for the object 102 may comprise determining a shape of the object 102 through non-damaged regions, and extrapolating and/or interpolating the non-damaged shape through any damaged regions 116. In certain embodiments, the contour mapping 210 includes curve-fitting, polynomial fitting, utilization of splines, or similar descriptions of the object 102 where the material of the object 102 is irregular or otherwise does not conform to a design or smooth shape. The contour mapping 210 may comprise surface locations and contours for the object 102. The contour mapping 210 may include the entire object 102 and/or a relevant portion of the object 102. The controller 108 may store contour mapping information 210, for example in a computer memory location.

The controller 108 commands the photogrammetry device 104 to scan a non-conforming region 116 (i.e. a damaged, worn, corroded, mis-manufactured, design specification change after manufacturing, or otherwise non-conforming region) of the three-dimensional object 102. The controller 108 generates a digital description 212 of the non-conforming region 116 of the object 102. The digital description 212 may include coordinate measures, and describes aspects of the non-conforming region 116 that lie outside of the contour mapping 210; non-limiting examples include burrs, deformation, nicks, or corrosion causing a portion of the object 102 to project beyond the contour map 210. The controller 108 may generate the digital description 212 of the non-conforming region 116 of the object 102 during the contour mapping operations or as a separate process after the contour mapping operations.

The controller 108 calculates a material removal tool path 214, which is a path followed by a material removal tool 110 that removes selected material from the object 102, where the material is located outside the nominal surface location and contour. For example, a material removal control module 216 interprets the contour mapping 210 and the digital description 212, and determines the material removal tool path 214 that will remove non-conforming portions of the object 102 that project beyond the contour map 210. The material removal tool 110 is a controllably operable tool for removing material comprising the object 102, and may for example be a milling tool, drill, grinding, EDM or other tool adapted for removing material. The material removal tool 110 may comprise a plurality of machine tools that collectively perform material removal along the material removal tool path 214. The controller 108, in certain embodiments, repairs the object 102 by commanding the material removal tool 110 according to the material removal tool path 214.

In certain embodiments, the digital description 212 includes a design specification for the object 102, and the material removal tool path 214 includes a tool path to remove portions of the object 102 that project beyond the design specification. For example, the object 102 may be a blade for a turbine rotor, where the design of the blade is changed after manufacture. The blade of the object 102 may conform to the contour mapping 210, but portions of the blade may project beyond the design specification and the controller 108 is structured to remove portions of the blade projecting beyond the design specification.

The controller 108 generates a solid model 218 of the non-conforming region 116. The solid model 218 of the non-conforming region 116 may be determined according to the contour mapping 210 and a prior scan noting missing material 118 (refer to FIG. 1). For example, a material addition control module 220 interprets the contour mapping 210 and the digital description 212, and determines a solid model 218 which, if the object 102 conformed to, the object 102 would substantially meet the nominal surface location and contour 210. In certain embodiments, the solid model is determined according to a design specification. For example, the object 102 may be a blade for a turbine rotor, where the design of the blade is changed after manufacture. The blade of the object 102 may conform to the contour mapping 210, but the blade may not have material in portions of the design specification region, and the controller 108 is structured to add material to portions of the blade to build up the blade to the design specification.

In certain embodiments, the controller 108 commands the photogrammetry device 104 to re-scan the damaged region 116 and determines the solid model 218 of the non-conforming region 116 according to the contour mapping 210 and a prior scan noting missing material. The solid model 218 may include the object 102, portions of the object 102, and/or just the material additions that, if provided, restore the object 102 to the nominal surface location and contour. In certain embodiments, the controller 108 generates the solid model 218 from the digital description 212 of the non-conforming region 116 of the object 102 generated for determining the material removal tool path 214. In certain embodiments, the controller 108 refreshes the digital description 212 of the non-conforming region 116 after the material removal tool 110 operates according to the material removal tool path 214 by re-scanning the non-conforming region 116.

The controller 108 computes a material addition tool path 222 according to the solid model 218. In certain embodiments, the controller 108 repairs the object 102 by operating a material addition tool 112 according to the material addition tool path 222. The material addition tool 112 comprises any known tool adapted to deposit, apply, or attach material to the object 102. In certain embodiments, the material addition tool path 222 includes multiple passes of the material addition tool 112. For example, the material addition tool 112 may add a specified amount or thickness of material with each pass to ensure that added material conforms to a specific microstructure. For example, the material addition tool 112 may be a laser powder deposition tool that applies a metal powder to the surface of the object, which is then melted and resolidified by a laser to apply successive layers of material to the object. However, the present application is not limited to a laser powder deposition tool. In certain embodiments, the controller 108 includes a tool control module 224 that provides material addition tool commands 226 and material removal tool commands 228 according to the material addition tool path 222 and the material removal tool path 214. In certain embodiments, the material removal tool path 214 and/or the material addition tool path 222 may comprise a single pass or multiple passes of the material removal tool 110 and/or the material addition tool 112.

Figure 3:
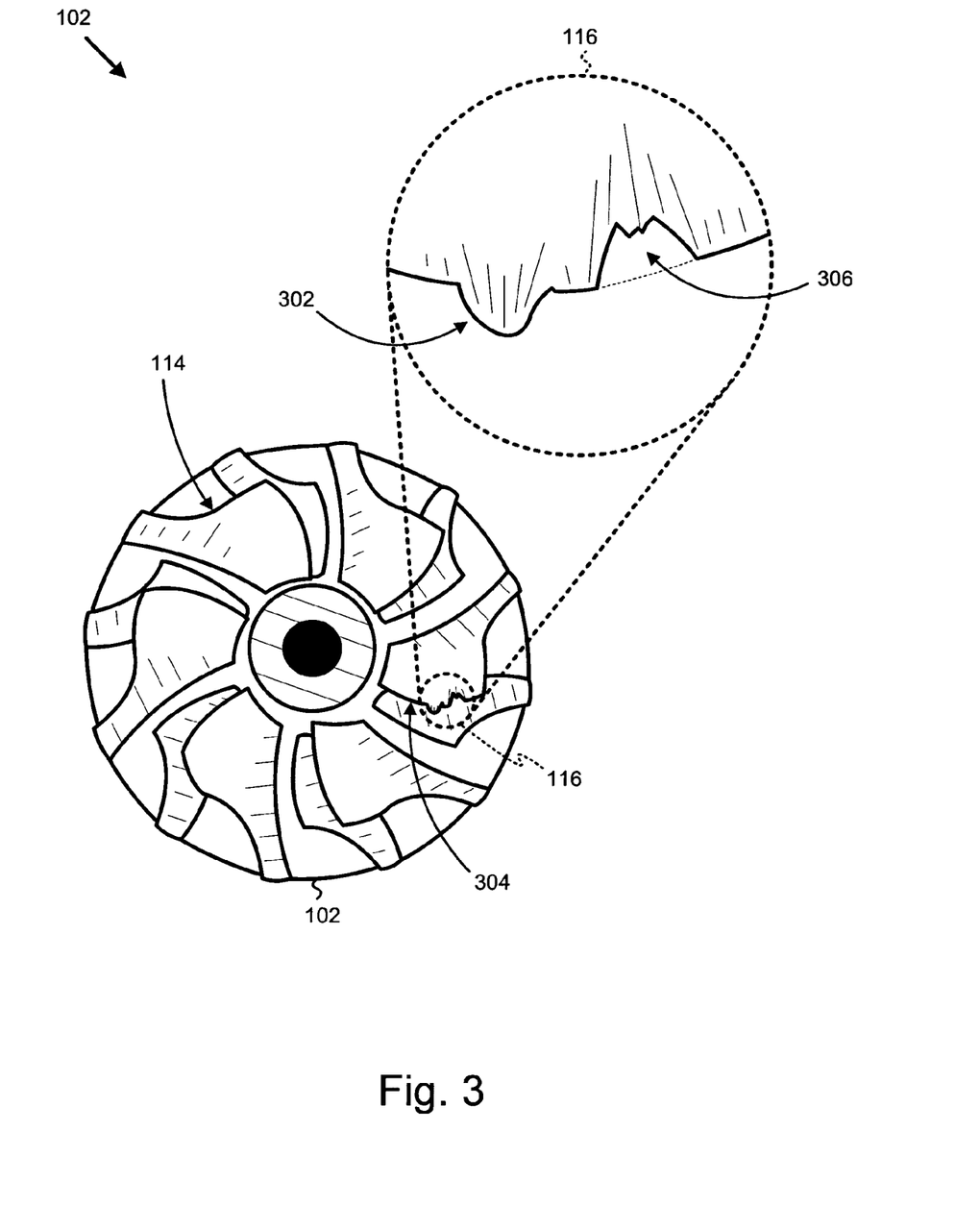
FIG. 3 is an illustration of a damaged bladed disk.

FIG. 3 is an illustration of a damaged bladed disk 102. The disk 102 includes a non-conforming region 116, which is a damaged region in the example of FIG. 3. The non-conforming region 116 includes a region with extra material 302 that projects outside a nominal surface location and contour 210 of the damaged disk blade 304. The non-conforming region 116 further includes a region with missing material 306, wherein added material can restore the damaged disk blade 304 to the nominal surface location and contour 210 of the disk blade 304. The added material may bring the disk blade 304 to the nominal surface location and contour 210. In certain embodiments, the added material creates a new configuration that the blade may not have previously conformed with. For example where a damage event occurs before the blade is completed, where the blade is mis-manufactured, or where the manufacturer changes the specification, the nominal surface location and contour 210 includes a set of conditions the disk blade 304 never previously included.

Figure 4A:
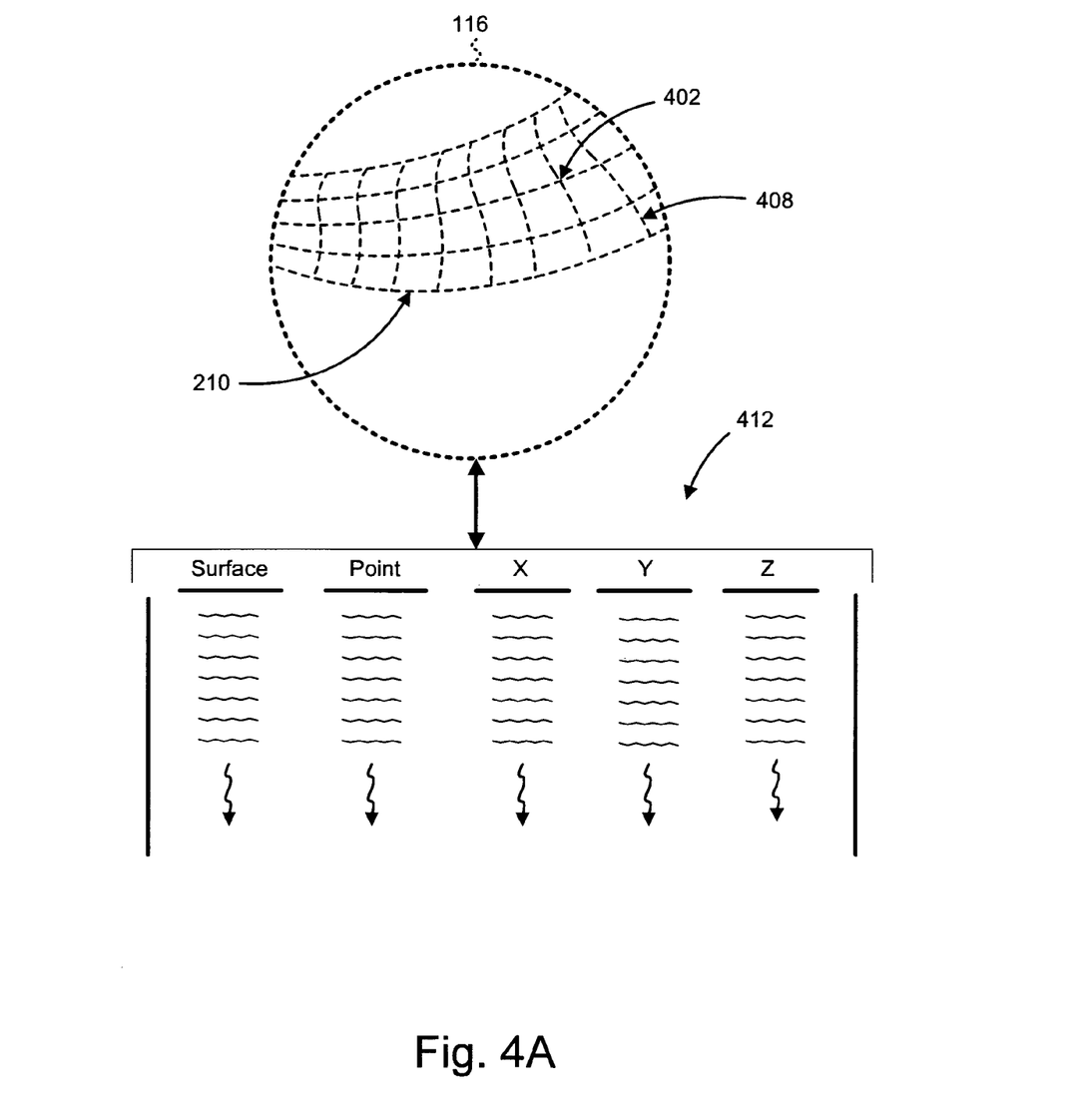
FIG. 4A is an illustration of a nominal surface location and contour for an object.
Figure 4B:
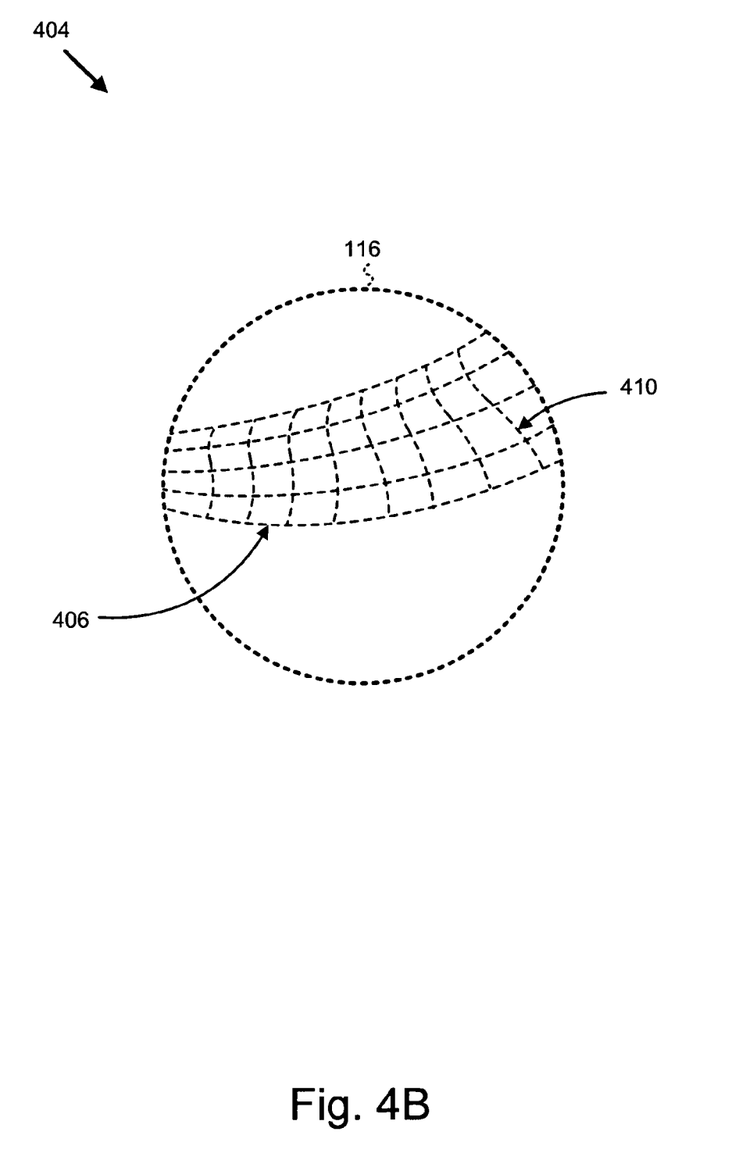
FIG. 4B is an illustration of a manufacturer specified surface location and contour for an object.

FIG. 4A is an illustration of a nominal surface location and contour 210 (or, contour map 210) for an object 102. The contour map 210 comprises a set of three-dimensional points (e.g. 402) describing the nominal shape of the object 102, or the shape that is desired after repair. The contour map 210 has features that, if implemented, bring the object 102 into compliance with a performance specification for the object 102, but may not be identical or equal to an original manufacturer specification. With reference to FIG. 4B, there is depicted an example of a manufacturer specification contour 404 illustrating a contour 406 of the object 102 at a time of manufacture. The contour 406 from the manufacturer, in the example, reveals that some creep (e.g., compare 408 (FIG. 4A) and 410 (FIG. 4B) at the blade tip) has changed the nominal shape of the object 102, but not to a degree indicating excessive wear or that the worn object 102 is out of compliance with a performance specification.

The contour map 210 may be stored information such as point information in a table 412. The table 412 illustrates one illustrative method of storing digital data describing the object 102, and the table 412 illustrates one data set that can store the digital description 212 to a desired specificity and resolution. For example, a compressor wheel 102 may have 12 blades, and a table 412 may include 25 surfaces (e.g. 2 sides of each blade, plus the disk surface), with enumerated points including specified x, y, and z values for each enumerated point. In the non-limiting example, each surface may correspond to a given number of enumerated points based on the required resolution to describe the object surface and the damage. In the example, the photogrammetry device 104 provides photographic information to specify the values for the table 412 to the desired degree required based on the complexity of the object 102 and the type of damage in the non-conforming region 116 being detected.

Figure 5:
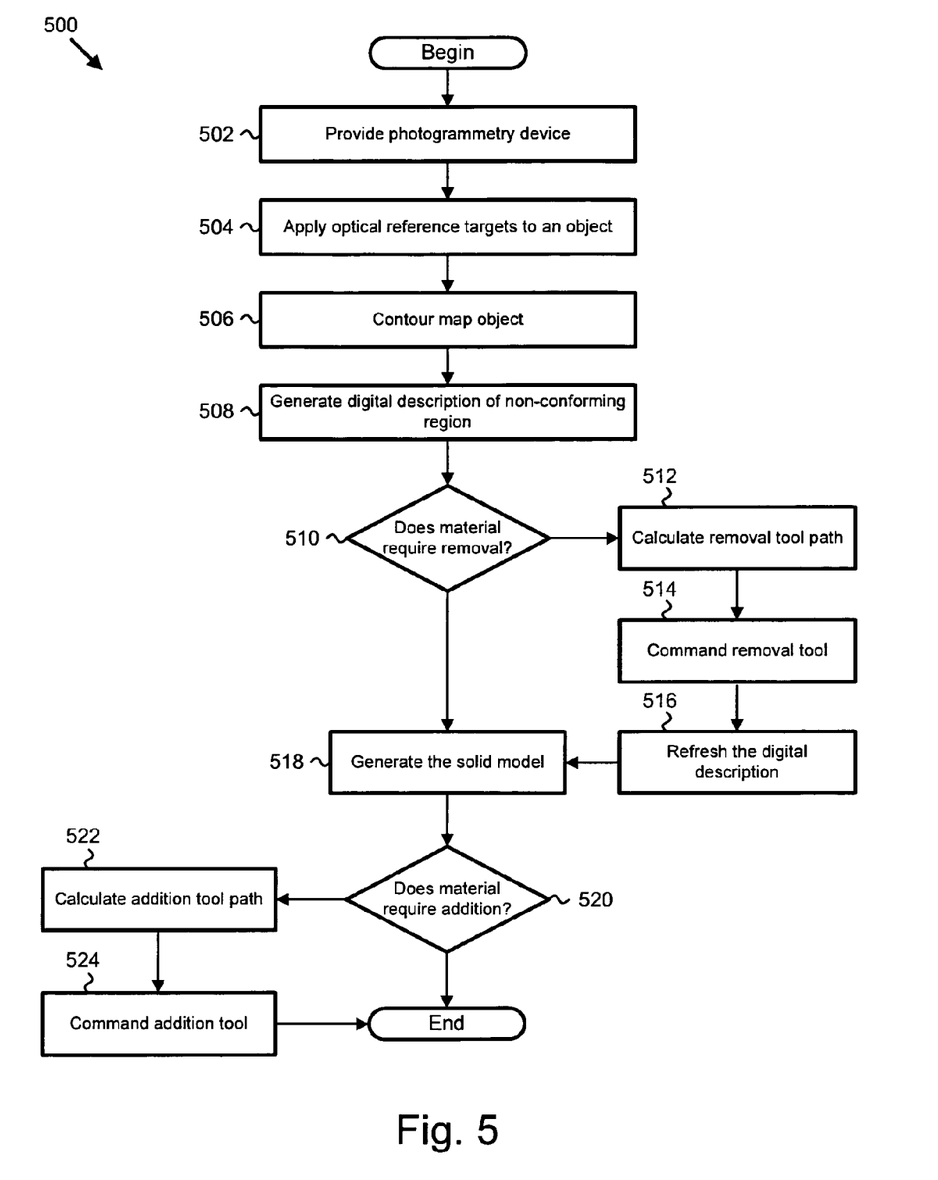
FIG. 5 is a schematic flow chart diagram illustrating a procedure for repairing a three-dimensional object.

The illustration of FIG. 5 and the related descriptions that follow are exemplary and numerous other variations are contemplated. For example, operations may be modified, combined, or subdivided, and different variables, states, events, conditionals, tests, logics, systems, flow charts and/or algorithms are contemplated. Furthermore, portions and/or combinations of the illustrated and described charts and algorithms and/or variations thereof may be present in various embodiments, although no portion, whole, or combination need necessarily be present. Also, the operations may reside in hardware, software, firmware, logic or combinations or portions thereof and may be run, processed, executed, loaded and/or stored in whole or part, in or on different components, devices, or codes, separately, simultaneously, concurrently, and/or in a time or resource sharing configuration or various combinations thereof. Operations may be performed as a computer program product operating on a computer readable medium.

FIG. 5 is a schematic flow chart diagram illustrating a procedure 500 for repairing a three-dimensional object 102. The procedure 500 includes an operation 502 to provide a photogrammetry device 104, and an operation 504 to apply optical reference targets 106 to the object 102. The procedure 500 further includes an operation 506 to contour map the object 102 with the photogrammetry device 104. The procedure 500 further includes an operation 508 to generate a digital description 212 of a non-conforming region 116 of the object 102 with the photogrammetry device 104. The procedure 500 further includes, in certain embodiments, an operation 510 to determine whether the non-conforming region 116 of the object 102 requires material removal.

If the object 102 requires material removal, the procedure 500 includes an operation 512 to calculate a material removal tool path and an operation 514 to command a material removal tool 110 according to the material removal tool path 214. In certain embodiments, the procedure 500 further includes an operation 516 to refresh the digital description 212, and an operation 518 to generate a solid model 218.

If the object 102 does not require material removal, in certain embodiments the procedure 500 continues with the operation 518 to generate a solid model 218.

Based on the digital description 212 (first and/or refreshed) and the solid model 218, the procedure 500 includes a conditional operation 520 to check whether the object 102 requires material addition. If the object 102 does not require material addition, the procedure 500 ends. If the object 102 requires material addition, the procedure 500 includes an operation 522 to calculate a material addition tool path 222 and an operation 524 to command a material addition tool 112 according to the material addition tool path 222.

As is evident from the figures and text presented above, a variety of embodiments according to the present invention are contemplated. In certain embodiments, a system includes a photogrammetry device, a three-dimensional object having a damaged region, and a plurality of optical reference targets.

In certain embodiments, the system includes a controller that commands the photogrammetry device to scan the object and generate surface location and contour information of the object, including a nominal surface description of the object at the damaged region. In certain embodiments, the controller commands the photogrammetry device to scan the damaged region and develop a digital description of the damaged region. In certain further embodiments, the controller calculates a material removal tool path based on the nominal surface description and the digital description, and commands a material removal tool according to the material removal tool path. In certain further embodiments, the controller commands the photogrammetry device to scan the damaged region and refresh the digital description of the damaged region. In certain embodiments, the controller computes a solid model of the object, at least over the damaged region, calculates a material addition tool path based on the solid model and the digital description, and commands a material addition tool according to the material addition tool path.

In certain embodiments, the three-dimensional object is a bladed disk. In certain embodiments, the nominal surface description is not identical or equivalent to a manufacturer specified surface description for the object. In certain embodiments, the damaged region occurs at a blade tip.

In certain embodiments, a method includes providing a photogrammetry device and applying optical targets to an object. The object may be a complex three-dimensional object. In certain embodiments, the method includes generating a contour map of the object, and generating a digital description of a damaged region of the object. In certain embodiments, the method includes checking whether the object requires material removal, and calculating a material removal tool path if the object requires material removal. In certain embodiments, the method further includes commanding a material removal tool according to the material removal tool path, and refreshing the digital description of the damaged region of the object. In certain further embodiments, the method includes generating a solid model based on the contour map of the object and the digital description of the damaged region of the object, and checking whether the object requires material addition. In certain embodiments, if the object requires material addition, the method includes calculating a material addition tool path, and commanding a material addition tool according to the material addition tool path.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   applying optical reference targets to an object;
   contour mapping the object with a photogrammetry device;
   generating a digital description of a non-conforming region of the object with the photogrammetry device in response to the contour mapping, wherein the digital description includes a material removal tool path;
   repairing the object based on the digital description, wherein repairing the object comprises operating a removal tool according to the material removal tool path, wherein said repairing includes computing a material addition tool path and operating a material addition tool according to the material addition tool path, and wherein said operating the removal tool according to the material removal tool path is performed before said operating the material addition tool according to the material addition tool path.

2. The method of claim 1, further comprising generating a solid model of the damaged region of the object according to a manufacturer contour specification, and wherein repairing the object further includes computing the material removal tool path according to the solid model.

3. The method of claim 1, further comprising generating a solid model of the damaged region of the object based on the digital description, and wherein repairing the object further includes computing the material addition tool path according to the solid model and operating a the material addition tool according to the material addition tool path.

4. The method of claim 1, wherein the non-conforming region comprises an object design specification change.

5. The method of claim 1, wherein the object comprises a complex three-dimensional geometry.

6. The method of claim 1, wherein the object comprises a surface having a plurality of concavities.

7. The method of claim 1, wherein the object comprises a bladed disk.

8. The method of claim 1, wherein contour mapping the object comprises generating a nominal surface location and contour for the object, wherein the nominal surface location and contour is not identical to the non-conforming region of the object.

9. The method of claim 8, wherein the digital description includes a material removal tool path, and wherein the material removal tool path comprises a path adapted to remove material from the object that is located outside the nominal surface location and contour.

10. The method of claim 8, further comprising generating a solid model of the damaged region of the object based on the digital description, the solid model comprising a model of the object in conformance with the nominal surface location and contour for the object, and wherein repairing the object further includes computing the material addition tool path according to the solid model and operating the material addition tool according to the material addition tool path.

11. The method of claim 1, wherein the object is a gas turbine engine component.

12. The method of claim 1, wherein said repairing includes changing a portion of the object absent a defect.

13. A system, comprising:
   a three-dimensional object having a non-conforming region;
   a photogrammetry device adapted to scan the three-dimensional object;
   a plurality of optical reference targets;
   a processing system structured to:
      command the photogrammetry device to scan the three-dimensional object;

calculate a nominal surface location and contour for the three-dimensional object, wherein the nominal surface location and contour is not identical to the non-conforming region of the object;

command the photogrammetry device to scan the non-conforming region of the three-dimensional object;

calculate a material removal tool path comprising a path adapted to remove material from the object that is located outside the nominal surface location and contour;

generate a solid model of the non-conforming region of the object based on the nominal surface location and contour for the three-dimensional object;

compute a material addition tool path according to the solid models further comprising a material removal tool structured to remove material from the three-dimensional object according to the material removal tool path, and a material addition tool structured to add material to the three-dimensional object according to the material addition tool path, wherein the controller is further structured to command the photogrammetry device to re-scan the non-conforming region of the three-dimensional object before generating the solid model.

14. The system of claim 13, wherein the processing system is further structured to command the material removal tool to remove material from the three dimensional object.

15. The system of claim 13, wherein the processing system is further structured to command the material addition tool to add material to the three dimensional object according to the material addition tool path.

16. The system of claim 15, wherein the material addition tool path comprises multiple passes of the material addition tool.

17. The system of claim 16, wherein the processing system is further structured to command the material addition tool to add material to the three dimensional object.

18. The system of claim 13, wherein the nominal surface location and contour for the three-dimensional object is not equal to a manufacturer specified surface location and contour.

19. The system of claim 13, wherein the three-dimensional object is a bladed disk that has been in service.

20. The method of claim 1, further comprising generating a solid model of the damaged region of the object according to a manufacturer contour specification, and wherein repairing the object further includes computing the material removal tool path and the material addition tool path according to the solid model.

21. The method of claim 8, wherein the wherein the nominal surface location and contour is not identical to an original manufacturer specification.

22. The method of claim 21, further comprising determining the nominal surface location and contour in response to a performance specification for the object.

* * * * *

UNITED STATES PATENT AND TRADEMARK OFFICE
CERTIFICATE OF CORRECTION

Page 1 of 1

| | |
|---|---|
| PATENT NO. | : 8,442,665 B2 |
| APPLICATION NO. | : 12/859659 |
| DATED | : May 14, 2013 |
| INVENTOR(S) | : Krause |

It is certified that error appears in the above-identified patent and that said Letters Patent is hereby corrected as shown below:

In the Claims,

Col. 8, line 27: remove the word "a" so that the claim reads:

"...to the solid model and operating the material addition tool..."

Col. 9, lines 15-16: replace the word "models" with "model" so that the claim reads:

"...compute a material addition tool path according to the solid model..."

Signed and Sealed this
Thirtieth Day of December, 2014

Michelle K. Lee
*Deputy Director of the United States Patent and Trademark Office*